US012602119B2

(12) United States Patent
Bar-Ness et al.

(10) Patent No.: US 12,602,119 B2
(45) Date of Patent: Apr. 14, 2026

(54) STYLUS MOVEMENT TRANSLATION SWITCHING

(71) Applicant: Microsoft Technology Licensing, LLC, Redmond, WA (US)

(72) Inventors: Assaf Bar-Ness, Ness Zionna (IL); Shoham Dekel, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/728,795

(22) PCT Filed: Jan. 30, 2023

(86) PCT No.: PCT/US2023/061537
§ 371 (c)(1),
(2) Date: Jul. 12, 2024

(87) PCT Pub. No.: WO2023/154633
PCT Pub. Date: Aug. 17, 2023

(65) Prior Publication Data
US 2025/0085792 A1 Mar. 13, 2025

(30) Foreign Application Priority Data
Feb. 9, 2022 (NL) ..................................... 2030860

(51) Int. Cl.
*G06F 3/01* (2006.01)
*G06F 3/0354* (2013.01)
(Continued)

(52) U.S. Cl.
CPC .......... *G06F 3/03545* (2013.01); *G06F 3/016* (2013.01); *G06F 3/0412* (2013.01); *G06F 3/0416* (2013.01); *G06F 3/04883* (2013.01)

(58) Field of Classification Search
CPC .... G06F 3/016; G06F 3/03545; G06F 3/0412; G06F 3/0416; G06F 3/04883
See application file for complete search history.

(56) References Cited

U.S. PATENT DOCUMENTS 6,836,267 B1 * 12/2004 Endo ................... G06F 3/04886
345/174
8,451,236 B2 5/2013 Duarte et al.
(Continued)

FOREIGN PATENT DOCUMENTS

CN 112394823 A 2/2021
EP 2128748 A2 * 12/2009 ............... H04B 1/40

OTHER PUBLICATIONS

Guim, Mark, "TouchMousePointer gives you a Virtual Trackpad for your Windows Tablet", Retrieved From: https://www.windowscentral. com/touchmousepointer-windows-virtual-trackpad, Mar. 2015, 13 pages.
(Continued)

*Primary Examiner* — Ryan A Lubit
(74) *Attorney, Agent, or Firm* — Alleman Hall LLP

(57) ABSTRACT
A method for a touch-sensitive display device includes detecting a first real-world movement of a stylus from a first surface position to a second surface position separated from the first surface position by a first real-world movement distance. The first real-world movement is translated into a first virtual movement from a first virtual input position to a second virtual input position using an absolute movement translation. Based on one or more movement translation context parameters, movement translation is switched from the absolute movement translation to a relative movement translation. A second real-world movement of the stylus is detected from the second surface position to a third surface position separated from the second surface position by a second real-world movement distance. The second real-
(Continued)

world movement is translated into a corresponding second virtual movement from the second virtual input position to a third virtual input position using the relative movement translation.

20 Claims, 11 Drawing Sheets

(51) Int. Cl.
G06F 3/041 (2006.01)
G06F 3/04883 (2022.01)

(56) References Cited

U.S. PATENT DOCUMENTS

| | | | |
|---|---|---|---|
| 10,860,110 B1 | 12/2020 | Files | |
| 2002/0084114 A1* | 7/2002 | Xu | G06F 3/03545 |
| | | | 178/19.07 |
| 2005/0028112 A1* | 2/2005 | Iijima | G06F 3/04883 |
| | | | 715/857 |
| 2005/0120312 A1 | 6/2005 | Nguyen | |
| 2009/0160805 A1* | 6/2009 | Hosokawa | G06F 3/0488 |
| | | | 345/173 |
| 2009/0278808 A1* | 11/2009 | Akiyama | G06F 3/0416 |
| | | | 345/173 |
| 2010/0079404 A1 | 4/2010 | Degner et al. | |
| 2010/0156813 A1* | 6/2010 | Duarte | G06F 3/0488 |
| | | | 345/173 |
| 2011/0169749 A1 | 7/2011 | Ganey | |
| 2014/0002386 A1 | 1/2014 | Rosenberg | |
| 2014/0002393 A1 | 1/2014 | Bao | |
| 2015/0084866 A1 | 3/2015 | Thomas et al. | |
| 2016/0139724 A1* | 5/2016 | Miller | B60K 35/10 |
| | | | 345/173 |
| 2016/0202760 A1* | 7/2016 | Churikov | G06F 3/0416 |
| | | | 345/173 |
| 2017/0371515 A1* | 12/2017 | Feit | B60K 35/22 |
| 2020/0174660 A1 | 6/2020 | Klein et al. | |

OTHER PUBLICATIONS

International Search Report and Written Opinion received for PCT Application No. PCT/US2023/061537, May 2, 2023, 18 pages.
Search Report Received for Netherlands Application No. N2030860, mailed on Oct. 20, 2022, 12 pages.
Sorensen, Sven, "TouchMousePointer", Retrieved From: https://touchmousepointer.en.lo4d.com/windows, Nov. 12, 2021, 4 pages.
Communication pursuant to Article 94(3) received for European Application No. 23706527.1, mailed on Aug. 20, 2025, 5 Pages.

* cited by examiner

Figure 3:
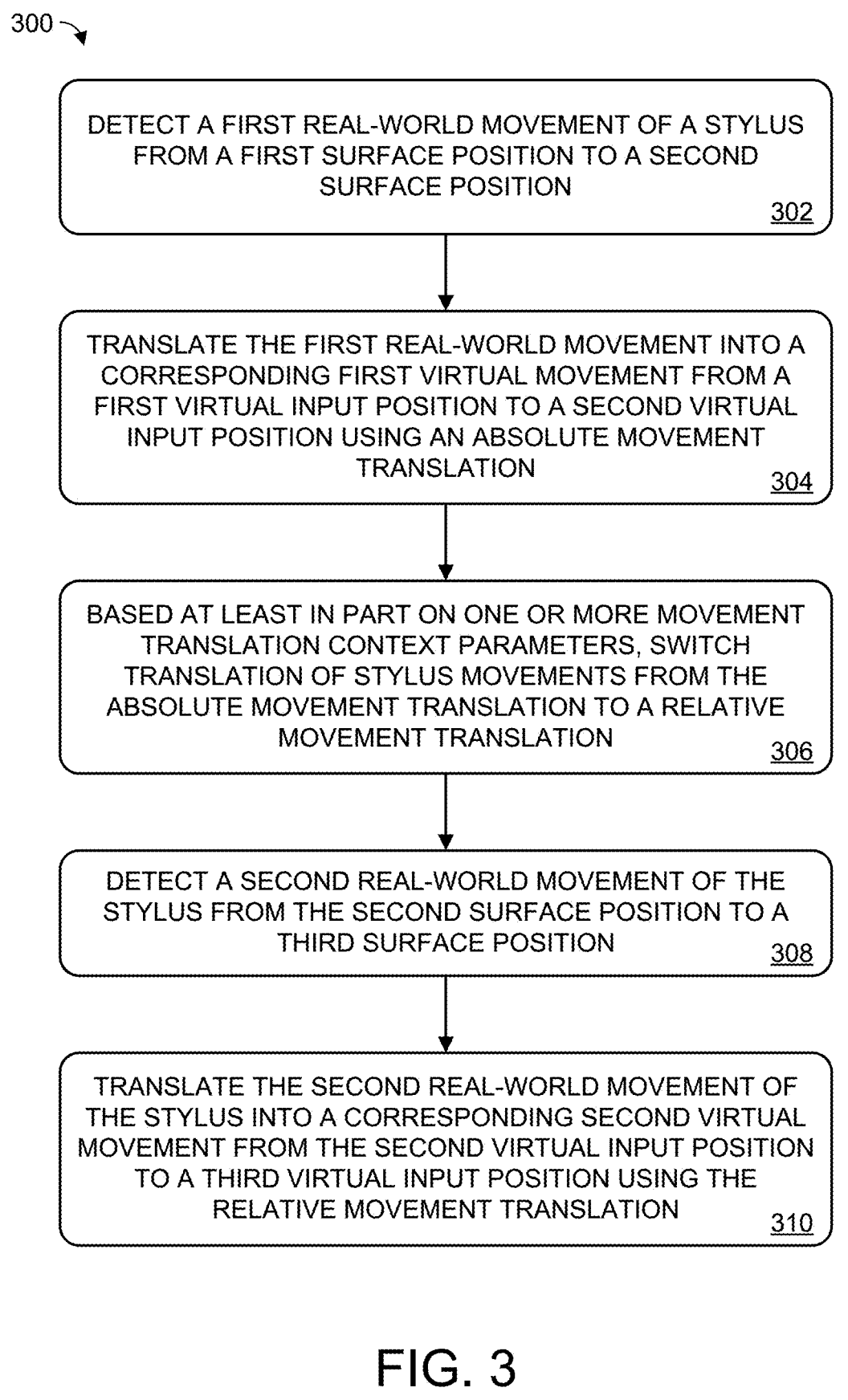

300

DETECT A FIRST REAL-WORLD MOVEMENT OF A STYLUS
FROM A FIRST SURFACE POSITION TO A SECOND
SURFACE POSITION

302

TRANSLATE THE FIRST REAL-WORLD MOVEMENT INTO A
CORRESPONDING FIRST VIRTUAL MOVEMENT FROM A
FIRST VIRTUAL INPUT POSITION TO A SECOND VIRTUAL
INPUT POSITION USING AN ABSOLUTE MOVEMENT
TRANSLATION

304

BASED AT LEAST IN PART ON ONE OR MORE MOVEMENT
TRANSLATION CONTEXT PARAMETERS, SWITCH
TRANSLATION OF STYLUS MOVEMENTS FROM THE
ABSOLUTE MOVEMENT TRANSLATION TO A RELATIVE
MOVEMENT TRANSLATION

306

DETECT A SECOND REAL-WORLD MOVEMENT OF THE
STYLUS FROM THE SECOND SURFACE POSITION TO A
THIRD SURFACE POSITION

308

TRANSLATE THE SECOND REAL-WORLD MOVEMENT OF
THE STYLUS INTO A CORRESPONDING SECOND VIRTUAL
MOVEMENT FROM THE SECOND VIRTUAL INPUT POSITION
TO A THIRD VIRTUAL INPUT POSITION USING THE
RELATIVE MOVEMENT TRANSLATION

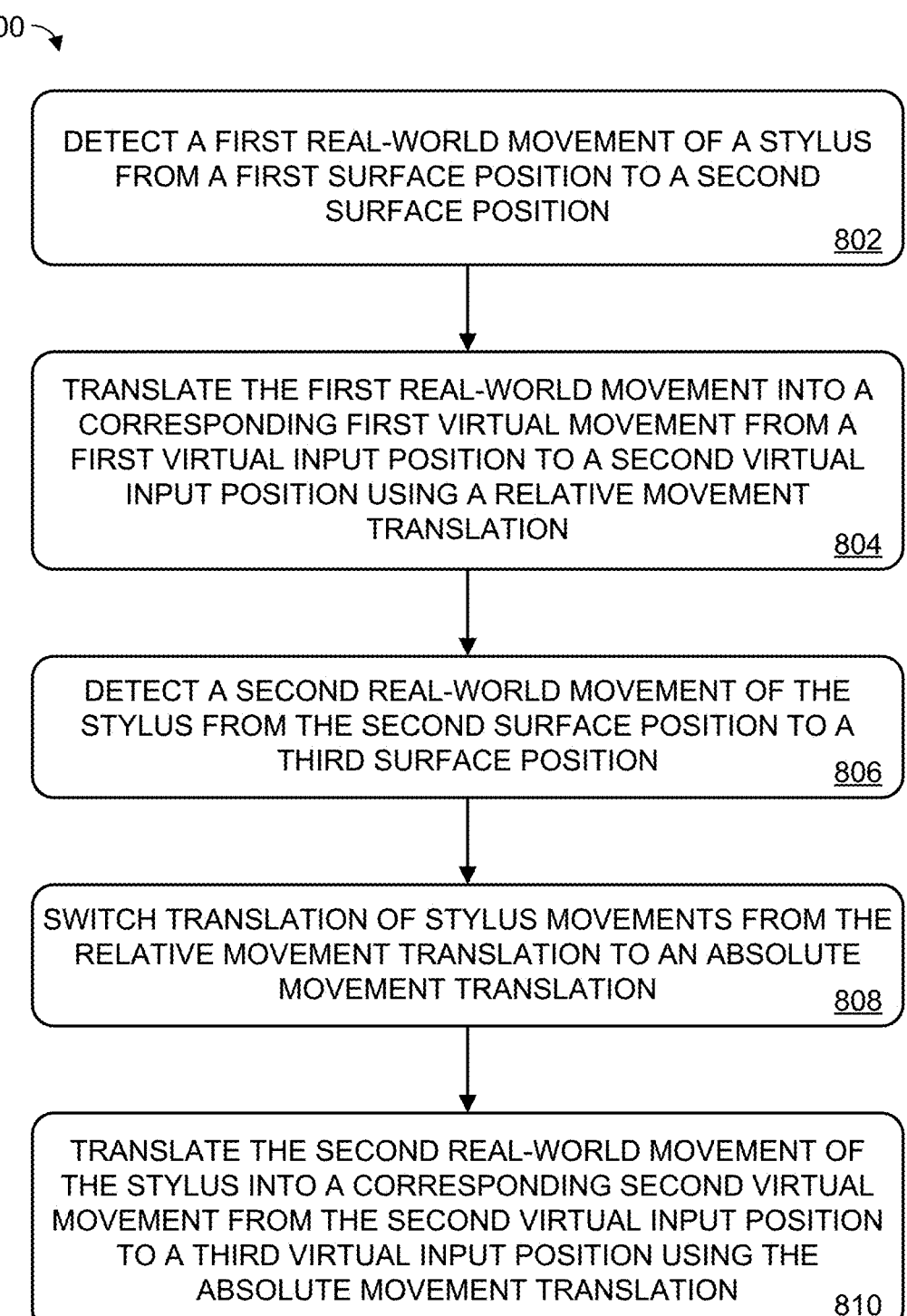

DETECT A FIRST REAL-WORLD MOVEMENT OF A STYLUS FROM A FIRST SURFACE POSITION TO A SECOND SURFACE POSITION
802

TRANSLATE THE FIRST REAL-WORLD MOVEMENT INTO A CORRESPONDING FIRST VIRTUAL MOVEMENT FROM A FIRST VIRTUAL INPUT POSITION TO A SECOND VIRTUAL INPUT POSITION USING A RELATIVE MOVEMENT TRANSLATION
804

DETECT A SECOND REAL-WORLD MOVEMENT OF THE STYLUS FROM THE SECOND SURFACE POSITION TO A THIRD SURFACE POSITION
806

SWITCH TRANSLATION OF STYLUS MOVEMENTS FROM THE RELATIVE MOVEMENT TRANSLATION TO AN ABSOLUTE MOVEMENT TRANSLATION
808

TRANSLATE THE SECOND REAL-WORLD MOVEMENT OF THE STYLUS INTO A CORRESPONDING SECOND VIRTUAL MOVEMENT FROM THE SECOND VIRTUAL INPUT POSITION TO A THIRD VIRTUAL INPUT POSITION USING THE ABSOLUTE MOVEMENT TRANSLATION
810

FIG. 8

STYLUS MOVEMENT TRANSLATION SWITCHING

CROSS REFERENCE TO RELATED APPLICATIONS

The present application is a U.S. National Phase of International Patent Application Serial No. PCT/US2023/061537 entitled "STYLUS MOVEMENT TRANSLATION SWITCHING", filed Jan. 30, 2023, which claims priority to Netherlands Patent Application Serial No. 2030860, filed Feb. 9, 2022, the entire contents of each of which are hereby incorporated by reference for all purposes.

BACKGROUND

Touch-sensitive input devices, such as touch-sensitive displays, may detect proximity of a suitable input object (e.g., stylus), and resolve the position of the input object to a two-dimensional input position. As the input object moves relative to the touch-sensitive input device, the two-dimensional input position may be correspondingly updated.

BRIEF DESCRIPTION OF THE DRAWINGS

FIG. 3 illustrates an example method for a touch-sensitive display device.

FIG. 8 illustrates another example method for a touch-sensitive display device.

DETAILED DESCRIPTION

Figure 1B:
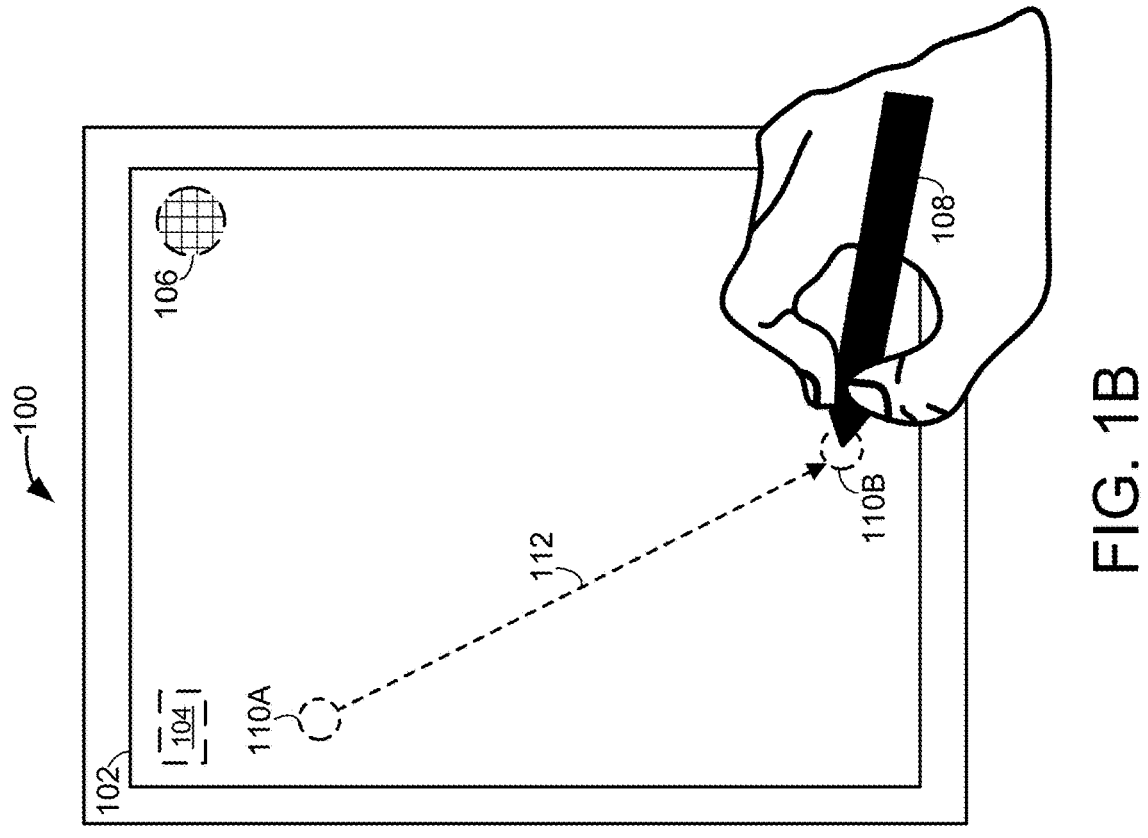
FIGS. 1A and 1B schematically illustrate movement of a stylus from a first surface position to a second surface position on a touch-sensitive display.

As discussed above, a touch-sensitive display device may detect a touch input caused by proximity of a suitable input object to the surface of a touch-sensitive display. As used herein, "touch input" refers to any input detected by a touch-sensitive display device that is caused by proximity or contact of an input object with the surface of a touch-sensitive display. In other words, the term "touch input" can refer to a) direct contact between the input object (e.g., a stylus tip) and the surface of the display, and/or b) "hover inputs" where the input object is spaced away from, but still detectable by, the touch-sensitive display. The present disclosure primarily focuses on input objects taking the form of active styluses, although it will be understood that this is non-limiting. Rather, input objects may take any suitable form—e.g., active styluses, passive styluses, or human fingers.

In some cases, the virtual input position of the touch input that is provided to software of the touch-sensitive display device (e.g., an operating system and/or software applications of the device) may be substantially aligned with the position on the display surface that the input object is contacting, or to which the input object is hovering in relative proximity (referred to herein as a "surface position"). As used herein, the term "substantially" generally means that the virtual input position is approximately the same as the surface position that the stylus is contacting or hovering over—e.g., within a margin of a millimeter. For example, if the touch-sensitive display device is operating in an "inking" mode, in which contact between a stylus tip and the display surface causes the display device to begin rendering graphical "ink," then the display device may render ink at a position that appears, from the user's perspective, to be substantially the same as the portion of the display surface that the user is touching with the stylus. As the user moves the stylus tip across the display surface, the changing surface position of the stylus may be translated into a changing virtual input position of the touch input in a substantially 1:1 relationship, meaning that the rendering of the graphical ink will appear to follow the stylus tip as it moves—e.g., each surface position along the movement of the stylus is translated into a corresponding virtual input position that falls within a small margin (such as one millimeter) of the surface position. The present disclosure uses the term "absolute movement translation" to refer to such a 1:1 relationship between display surface positions and corresponding virtual input positions of detected touch inputs.

However, translation of real-world stylus movements into virtual input positions used to control a touch-sensitive display device need not always be done using an absolute movement translation. The present disclosure is directed to techniques for switching translation of real-world stylus movements between an absolute movement translation and a relative movement translation, in which the virtual movement distance between any two virtual input positions may differ from the real-world movement distance of the stylus relative to the display surface. In this context, the real-world movement distance is an actual physical distance between two positions as measurable using measuring instruments. This may, for instance, enable a user to interact with interactable user interface elements presented at relatively distant positions relative to the touch-sensitive display by making a relatively small real-world stylus movement. As will be discussed in more detail below, the touch-sensitive display device may switch between using the absolute and relative movement translations for a variety of reasons, based at least in part on one or more movement translation context parameters. This may provide a technical benefit of improving human-computer interaction by tailoring translation of real-world stylus movements to the current device context.

Figure 1A:
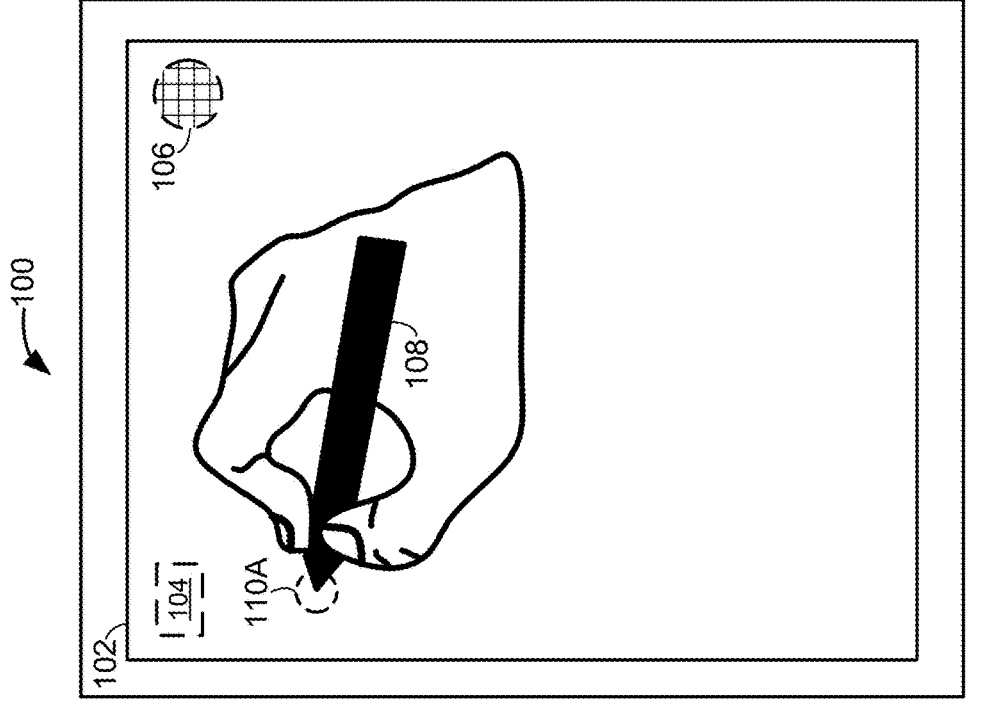

FIGS. 1A and 1B schematically illustrate detection of touch input at a touch-sensitive display device. Specifically, FIG. 1A schematically shows an example touch-sensitive display device 100 including a touch-sensitive display 102. Both the touch-sensitive display device 100 and the touch-sensitive display 102 may have any suitable size(s) and dimension(s). In this example, the touch-sensitive display device includes only one touch-sensitive display, although this is not limiting. In other examples, a touch-sensitive display device may have two or more touch-sensitive displays. In cases where the touch-sensitive display device includes two or more touch-sensitive displays, each display need not have the same size, shape, or resolution.

In some cases, a touch-sensitive display device may share a common housing with suitable computer hardware—e.g., such as in a mobile phone or tablet computer. In the example of FIG. 1A, touch-sensitive display device 100 includes a controller 104 configured to perform any or all computing functions of the touch-sensitive display device. In other examples, however, the touch-sensitive display device may be a standalone peripheral display (e.g., a monitor or television) configured to present content received from a separate device or source via a suitable wired or wireless connection. In any case, a touch-sensitive display device may have any suitable form factor and hardware configuration. A touch-sensitive display device may be implemented as computing system 1100 described below with respect to FIG. 11. Furthermore, controller 104 may be implemented via logic subsystem 1102 and storage subsystem 1104 described below with respect to FIG. 11.

The touch-sensitive display may be used to present rendered graphical content taking any suitable form. The rendered graphical content may have any suitable source—e.g., an on-board graphics processor, and/or a separate source device communicatively coupled with the touch-sensitive display device. The touch-sensitive display may use any suitable image-forming technology for presenting graphical content, and may have any suitable pixel resolution and refresh rate.

A touch-sensitive display may detect proximity of input objects in any suitable way, utilizing any suitable touch-sensing and/or hover-sensing technologies. For example, a touch-sensitive display may use a suitable capacitive touch sensor—e.g., relying on mutual capacitance or self-capacitance—although any suitable touch and/or hover-sensing technologies may be used, including non-capacitive technologies. In FIG. 1, the touch-sensitive display 102 includes a plurality of touch-sensitive electrodes 106 configured to detect proximity of input objects to the first touch-sensitive display. The touch-sensitive electrodes may, for example, detect a change in capacitance caused by proximity of an input object to a display surface, and/or detect touch inputs in other suitable ways. By monitoring electrical conditions at the plurality of touch-sensitive electrodes, controller 104 may determine the two-dimensional positions of any touch inputs relative to the surface of the touch-sensitive display. The touch-sensitive electrodes and touch controller are shown with dashed lines to indicate that they are disposed beneath the display surface. The electrodes may have any suitable resolution(s) and/or coverage area(s) (e.g., 100% coverage across all display area or less than 100% coverage).

In the example of FIG. 1A, an input object taking the form of a stylus 108 is providing touch input to touch-sensitive display 102. Specifically, the stylus is shown contacting a first surface position 110A relative to the physical surface of the touch-sensitive display. As discussed above, an input object need not directly contact the surface of a touch-sensitive display, but rather may "hover" in close proximity to the display surface. Nevertheless, this is still referred to herein as a "touch input" directed at a particular "surface position" relative to the display.

As will be described in more detail below, the first surface position 110A at which the stylus is detected may be translated into a first virtual input position, where the coordinates of the virtual input position influence the response of the touch-sensitive display device. For instance, if the coordinates of the virtual input position coincide with an application shortcut (or other interactable user interface element), the touch-sensitive display device may respond by launching the corresponding application.

In many cases, the virtual input position of the touch input will be substantially aligned with the corresponding surface position. In other words, from the perspective of a human user, the virtual input position will appear to be the same as the position at which they are providing touch input to the surface of the touch-sensitive display—e.g., if the user taps the portion of the display at which the application shortcut is visible, the virtual input position will fall within a display region associated with the application shortcut, and the touch-sensitive display device will launch the application. However, as will be described in more detail below, the virtual input position need not always be aligned with the surface position at which the touch input is detected. Furthermore, as discussed above, "substantially" aligned means that the virtual input position falls within a relatively short margin of the corresponding surface position, such as one millimeter.

FIG. 1B schematically illustrates a scenario in which the user has moved stylus 108 to a second surface position 110B, separated from first surface position 110A by a first real-world movement distance 112. First surface position 110A is also shown in FIG. 1B for reference. As with first surface position 110A, second surface position 110B may similarly be translated into a second virtual input position, the coordinates of which will influence any response by the touch-sensitive display device to the touch input. In cases where the second virtual input position is substantially aligned with the second surface position, then a virtual movement distance between the first and second virtual input positions may be substantially equal to real-world distance 112. It will be understood that "substantially" equal means equivalent to or approximately the same within margins of error in measurement.

Figure 2B:
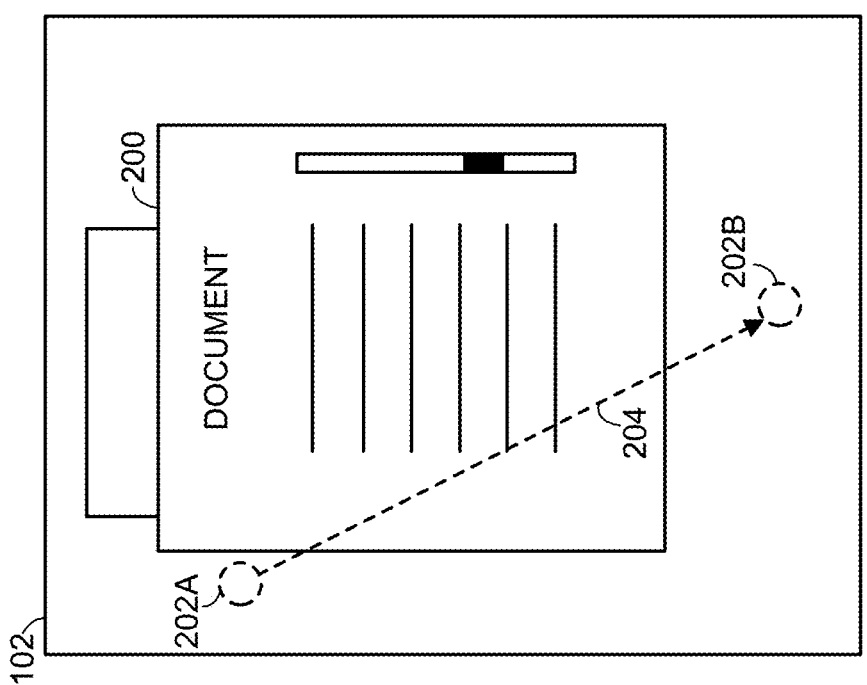
FIGS. 2A and 2B schematically illustrate movement of a stylus virtual input position using an absolute movement translation.
Figure 2A:
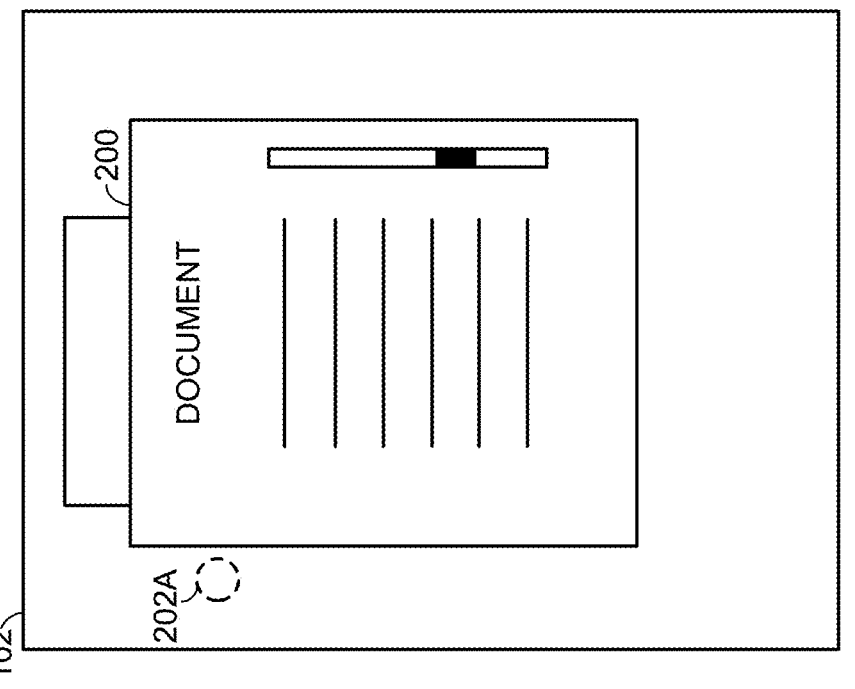

This scenario is schematically illustrated with respect to FIGS. 2A and 2B, each showing touch-sensitive display 102 of touch-sensitive display device 100. In FIGS. 2A and 2B, the touch-sensitive display is shown as displaying graphical content 200. It will be understood that the specific graphical content shown in FIGS. 2A and 2B, as well as the other FIGS. described herein, is non-limiting and provided only for the sake of example. Furthermore, the graphical content is shown in FIGS. 2A and 2B but not shown in FIGS. 1A and 1B. This is done to emphasize that FIGS. 2A and 2B deal with virtual content and virtual input positions, while FIGS. 1A and 1B deal with physical objects in the real world. It will be understood that the touch-sensitive display device may provide any suitable graphical content as touch input is provided to the display surface via a suitable input object, and in some cases, the touch-sensitive display device may respond to the touch input by changing the graphical content.

FIG. 2A shows a first virtual input position 202A, which corresponds to first surface position 110A in FIG. 1A. Furthermore, virtual input position 202A is substantially aligned with surface position 110A, meaning, as discussed above, that the coordinates of the virtual input position are substantially the same as the surface position at which the user is providing touch input. It will be understood that the virtual input position of the touch input may or may not be graphically represented by the touch-sensitive display device. In some examples, the touch-sensitive display device may render a cursor, icon, or other suitable graphical representation at the virtual input position. In other examples, the touch-sensitive display device need not render any specific graphical representation at the virtual input position.

As with FIG. 1B, FIG. 2B schematically illustrates a scenario in which the stylus has moved from first surface position 110A to second surface position 110B. The second surface position of FIG. 1B is translated into a second virtual input position 202B, shown in FIG. 2B. First virtual input position 202A is also shown in FIG. 2B for reference. Second virtual input position 202B is substantially aligned with second surface position 110B of FIG. 1B. As such, a virtual movement distance 204 between the first and second virtual input positions is substantially equal to the real-world movement distance 112 between the first and second surface positions. In other words, the real-world movement of the stylus relative to the display surface is translated using the absolute movement translation.

However, as discussed above, the touch-sensitive display device may in some cases switch between the absolute movement translation and a relative movement translation in translating real-world movements of a stylus into virtual movements. Accordingly, FIG. 3 illustrates an example method 300 for a stylus movement translation switching. Method 300 may be implemented by any suitable computing system of one or more computing devices. Any computing devices implementing method 300 may have any suitable capabilities, hardware configuration, and form factor. For example, method 300 may be implemented by touch-sensitive display device 100. In some cases, method 300 may be implemented by computing system 1100 described below with respect to FIG. 11.

Method 300 is described from the perspective of switching from the absolute movement translation to the relative movement translation. It will be understood that this is not limiting. In other examples, the touch-sensitive display device may use the relative movement translation, then switch to the absolute movement translation based at least in part on one or more movement translation context parameters, as will be described in more detail below. In general, the touch-sensitive display device may switch between the absolute and relative movement translations at any variety of suitable times and for any variety of suitable reasons.

At 302, method 300 includes, at a touch-sensitive display of the touch-sensitive display device, detecting a first real-world movement of a stylus from a first surface position to a second surface position separated from the first surface position by a first real-world movement distance. This may be done substantially as described above with respect to FIGS. 1A and 1B—e.g., schematically illustrating a real-world movement 112 between a first surface position 110A and a second surface position 110B relative to a touch-sensitive display 102 of touch-sensitive display device 100.

Continuing with method 300, the method includes, at 304, translating the first real-world movement of the stylus into a corresponding first virtual movement from a first virtual input position substantially aligned with the first surface position to a second virtual input position using an absolute movement translation. Due to the absolute movement translation, the second virtual input position may also be substantially aligned with the second surface position, such that a first virtual movement distance between the first virtual input position and the second virtual input position is substantially equal to the first real-world movement distance. As discussed above, this is illustrated with respect to FIGS. 2A and 2B, where first and second virtual input positions 202A and 202B are substantially aligned with first and second surface positions 110A and 110B of FIGS. 1A and 1B. Furthermore, the virtual movement distance 204 is substantially equal to the real-world movement distance 112 of the stylus.

In general, translating a real-world movement of a stylus using the absolute movement translation involves translating two or more detected surface positions of the stylus into corresponding virtual input positions that are substantially aligned with the surface positions. In this manner, the virtual distance between the virtual input positions will be substantially equal to the real-world distance between the corresponding surface positions. A real-world stylus movement may be detected and tracked with any suitable granularity. For instance, a real-world stylus movement may be detected as two surface positions corresponding to the beginning and endpoints of the movement. As another example, the movement of the stylus may be continuously tracked as a range of surface positions, and translated into a corresponding range of virtual input positions. Each different detected surface position may be separated by any suitable real-world distance, including a minimum distance detectable by the touch-sensitive display device.

Continuing with method 300, at 306, the method includes, based at least in part on one or more movement translation context parameters, switching translation of stylus movements from the absolute movement translation to a relative movement translation. As will be described in more detail below, the movement translation context parameters may take a wide variety of suitable forms, relating to any number of different factors that may influence whether the absolute or relative movement translation would be beneficial in a given scenario. Based on a consideration of one or more movement translation context parameters (e.g., such as a weighted consideration of multiple parameters), the touch-sensitive display device begins translating real-world movements of the active stylus using the relative movement translation.

Figure 4A:
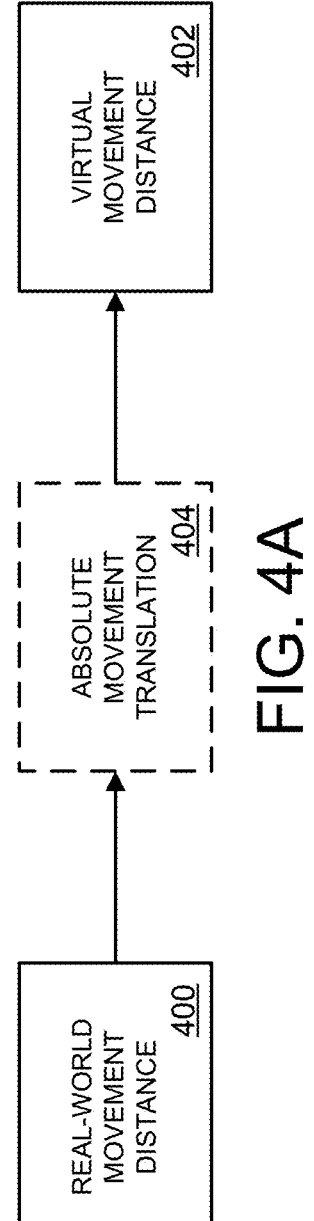
FIGS. 4A and 4B schematically illustrate switching from an absolute movement translation to a relative movement translation.
Figure 4B:
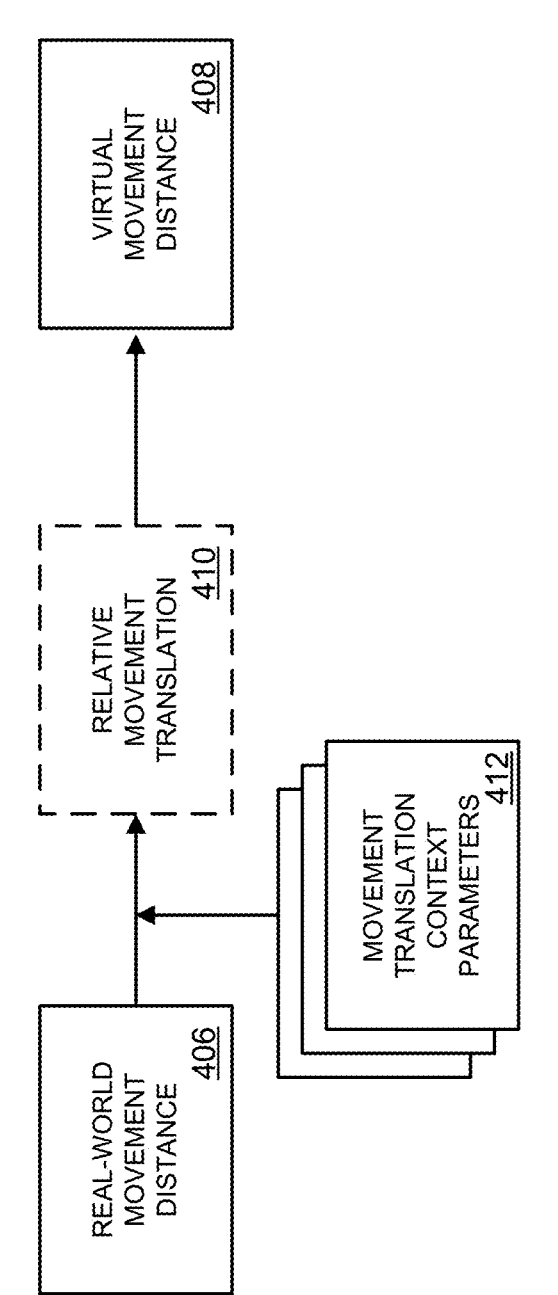

This process is schematically illustrated with respect to FIGS. 4A and 4B. Specifically, in FIG. 4A, the touch-sensitive display device translates a first real-world movement distance 400 into a first virtual movement distance 402, using an absolute movement translation 404. The first real-world movement distance 400 and the first virtual movement distance 402 may be substantially equal, as described above.

By contrast, in FIG. 4B, a second real-world movement distance 406 is translated into a second virtual movement distance 408 using a relative movement translation 410. The decision to switch to the relative movement translation, and/or the specific effect of the relative movement translation, may be based at least in part on one or more movement translation context parameters 412. As will be discussed in more detail below, the movement translation context parameters may take a wide variety of suitable forms, relating to any number of different factors that may influence whether the absolute or relative movement translation would be beneficial in a given scenario.

In general, using a "relative" movement translation means that the real-world movement distance of a stylus between two surface positions is translated into a virtual movement that is different from, but may still be proportional to, the real-world movement distance. As one example, using the relative movement translation may be akin to using a computer mouse, where a relatively small real-world movement of the mouse results in a relatively larger movement of an on-screen cursor. This may enable a user to interact with different interactable user interface elements presented at relatively distant positions on the touch-sensitive display by making a relatively small real-world movement of the stylus, which can be particularly beneficial when using relatively larger displays. As another example, the real-world movement distance of the stylus may be translated into a relatively smaller virtual movement. This may, for instance, improve the precision with which the user is able to provide touch input to the touch-sensitive display device, as relatively larger real-world movements are translated into relatively finer on-screen inputs.

In general, the touch-sensitive display device switches from the absolute movement translation to the relative movement translation (or vice versa) based at least in part on one or more movement translation context parameters. As one non-limiting example, these can include an indication of whether any surface positions fall within a virtual trackpad region defined relative to the touch-sensitive display. This is schematically illustrated with respect to FIG. 5A, again schematically showing touch-sensitive display device 100. In FIG. 5A, a virtual trackpad region 500 is defined within the area of touch-sensitive display 102.

The touch-sensitive display device may switch between the absolute and relative movement translations based at least in part on whether a current surface position to which the touch input is directed falls within the virtual trackpad region. This is the case in FIG. 5A, in which an example stylus 502 is contacting a location on the display surface that falls within virtual trackpad region 500. As one example, if the surface position of the touch input falls within the virtual trackpad region, then the touch-sensitive display device may use the relative movement translation—e.g., a relatively small real-world movement of the stylus within the trackpad region may be translated into a relatively larger movement of virtual input positions. For instance, movements of the stylus within the trackpad region may cause larger movements of a graphical on-screen cursor, which may move beyond the boundaries of the virtual trackpad region. If the surface position of the touch input moves beyond the virtual trackpad region, then the touch-sensitive display device may switch to the absolute movement translation in interpreting future stylus movements.

In the example of FIG. 5A, the virtual trackpad region has a smaller area than the touch-sensitive display. However, this need not always be the case. Rather, in other examples, the entire display area can function as a virtual trackpad region, and the determination as to whether to use the absolute or relative movement translations may be based on movement translation context parameters other than presence of a surface position within the trackpad region. Furthermore, in cases where the virtual trackpad region has a smaller area than the total display area, presence of a touch input surface position inside or outside of the virtual trackpad region need not be the only factor that influences whether the absolute or relative movement translations are used. For example, the user may contact the display surface within the virtual trackpad region, and yet the touch-sensitive display device may use the absolute movement translation based on a consideration of other movement translation context parameters. In some cases, the determination as to whether the absolute or relative movement translations are used may be based on a weighted consideration of multiple movement translation context parameters, where the boundaries of a virtual trackpad region are only one potential factor. Use of a virtual trackpad region that is smaller than the display area can provide a technical benefit by enabling a wider range of control inputs depending on the region of the display targeted by a given touch input.

As another example, the one or more movement translation context parameters may include an indication of a status of a mode switching mechanism of the stylus. For example, the stylus may include a button, switch, slider, and/or other suitable mechanism that allows a human user to manually switch between the absolute and relative translations. This is also schematically illustrated in FIG. 5A, where stylus 502 includes a mode switching mechanism 504. It will be understood that the specific form of the mode switching mechanism shown in FIG. 5A is provided only for illustration and should not be construed as limiting.

The stylus may communicate the current state of the mechanism to the touch-sensitive display device in any suitable way—e.g., via electrostatic communication, and/or via a suitable radio frequency (RF) communications channel. The state of the mode switching mechanism may be communicated to the touch-sensitive display device at any suitable frequency, and in some cases may only be communicated to the display device when the state of the mechanism changes (e.g., the user actuates a switch to change translation of stylus movements). In some cases, the state of the mode switching mechanism may override any or all other movement translation context parameters. For example, the surface position of the touch input may fall within virtual trackpad region 500 as discussed above, and yet the touch-sensitive display device may use the absolute movement translation as dictated by the state of the mode switching mechanism of the stylus.

As another example, the one or more movement translation context parameters may include an indication of whether a tip of the stylus is contacting a surface of the touch-sensitive display. As discussed above, "touch input" as described herein can refer both to direct contact between the stylus and display surface, as well as scenarios where the stylus tip is spaced away from, but still detectable at, a surface position on the display (e.g., the stylus is "hovering" over the display surface). In some cases, whether the touch-sensitive display device uses the absolute or relative movement translations may be at least partially influenced by whether the stylus is touching the display surface. For example, the absolute movement translation may be used while the stylus tip is contacting the display surface, while the relative movement translation may be used when the stylus tip is spaced away from the display surface.

The touch-sensitive display device may determine whether the stylus tip is contacting the display surface in any suitable way. As one example, the stylus may include an integrated pressure sensor in the stylus tip, and report a current pressure value measured by the pressure sensor to the touch-sensitive display device. If the pressure value is higher than a threshold, then the touch-sensitive display device may determine that the stylus tip is contacting the display surface. Additionally, or alternatively, the touch-sensitive display device may infer whether the stylus tip is touching the display surface based on signal characteristics reported by the plurality of touch-sensitive electrodes. For example, in cases where the stylus tip is contacting the display surface, the signal intensity and/or total area in which proximity of the stylus is detectable by the touch-sensitive electrodes may differ from cases where the stylus tip is spaced away from the display surface.

As another example, the one or more movement translation context parameters may include an indication of one or more software applications being executed by the touch-sensitive display device. For instance, the touch-sensitive display device may default to the absolute movement translation when one or more software applications are active (e.g., such as drawing or markup applications), and default to the relative movement translation when one or more other software applications are active (e.g., such as spreadsheets or word processors). Whether a software application is "active" can depend on whether the application is currently targeted by user input, whether a graphical window of the application is currently on screen or in "focus" compared to other application windows, or whether software instructions corresponding to the software application are being executed by the touch-sensitive display device at all, as non-limiting examples. This may provide a technical benefit of improving human-computer interaction and reducing burden of user input by automatically switching between different movement translations depending on what would be more beneficial given the currently-active software application.

Furthermore, the one or more movement translation context parameters may include an indication of a portion of a software application graphical interface targeted by any touch input surface positions. This is schematically illustrated with respect to FIG. 5B, which again shows touch-sensitive display 102 of touch-sensitive display device 100. In this example, the touch-sensitive display is presenting an application graphical interface 506 (e.g., corresponding to a text editing or word processing application) that includes two labeled portions 508A and 508B. Portion 508A corresponds to text of a document, while portion 508B corresponds to an interactable signature line. Again, this may provide a technical benefit of improving human-computer interaction and reducing burden of user input by automatically switching between different movement translations depending on what would be more beneficial given the portion of the application interface targeted by a user input.

In this example, the touch-sensitive display device may switch between the absolute and relative movement translations depending on which portion of the application interface is targeted by a touch input surface position. For instance, when portion 508A is targeted, the touch-sensitive display device may default to the relative movement translation, enabling a user to scroll through text of the document relatively quickly by making small real-world stylus movements. By contrast, when portion 508B is targeted, the touch-sensitive display device may default to the absolute movement translation, enabling the user to digitally sign the document using the stylus.

Figure 5B:
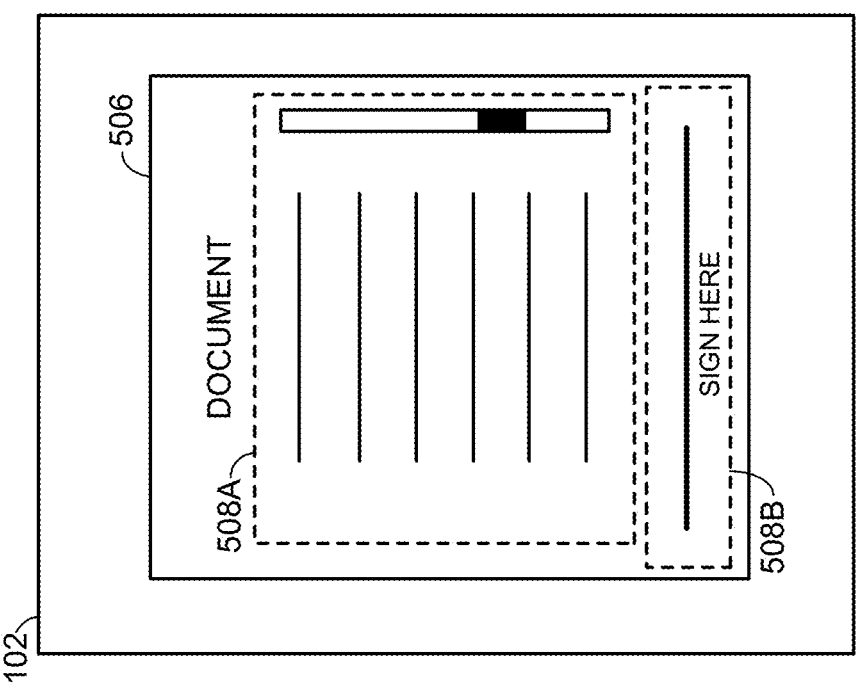
FIGS. 5A and 5B schematically illustrate different example movement translation context parameters.
Figure 5A:
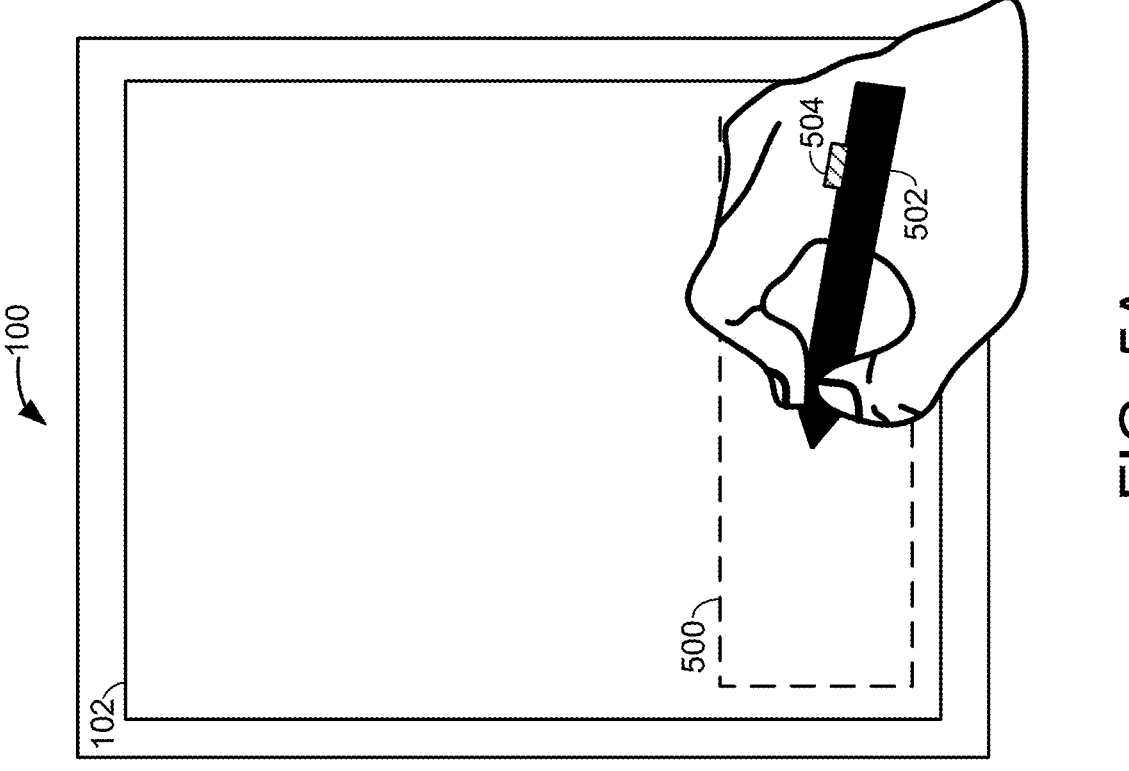

It will be understood that the scenario depicted in FIG. 5B is a non-limiting example. In general, a graphical interface of a software application may be divided into any number of different portions, and the touch-sensitive display device may use any suitable method for translating stylus movements based on which portion of the application interface is currently targeted, and/or based on any other movement translation context parameters.

As another example, the one or more movement translation context parameters may include an indication that recent movements of the stylus relative to the touch-sensitive display are consistent with a predefined gesture. For example, while operating using the absolute movement translation, the touch-sensitive display device may determine that a recent movement of the stylus is consistent with a gesture that triggers a temporary or persistent switch to relative movement translation. The touch-sensitive display device may maintain a library of one or more different predefined gestures, each of which may trigger a different response from the display device. For example, while using the absolute motion translation, a predefined "swipe" gesture may cause the touch-sensitive display device to begin using the relative movement translation. This may provide a technical benefit of improving human-computer interaction by providing a wider range of control over how different stylus movements are interpreted by the computing device.

A gesture may be detected in any suitable way. As examples, gestures may be detected based on a changing detected surface position of the stylus as indicated by signals detected by the plurality of touch-sensitive electrodes, and/or based on movement data received from the stylus. For example, the stylus may include one or more on-board motion sensors, such as an inertial measurement unit (IMU), configured to report a speed, acceleration, and/or other movement-related data of the stylus to the touch-sensitive display device. Such information may be transmitted to the display device in any suitable way—e.g., via electrostatic communication and/or via a suitable RF communications channel.

As another example, the one or more movement translation context parameters may include user-defined and/or automatic software settings of the touch-sensitive display device. For example, a user may interact with operating system settings, and/or stylus-specific settings, to manually specify when and how the touch-sensitive display device should switch between the absolute and relative movement translations. Additionally, or alternatively, the operating system of the touch-sensitive display device may be configured to default to one movement translation mode or the other depending on the hardware configuration of the display device—e.g., a touch-sensitive display device having a relatively larger display may default to the relative movement translation, while a device with a smaller display (such as a smartphone) may default to the absolute movement translation.

It will be understood that the specific movement translation context parameters discussed herein are non-limiting examples. In general, switching between absolute and relative movement translation modes may be done based on any suitable combination of any suitable number of different context parameters. In some cases, such switching may be done based at least in part on the output of a suitable artificial intelligence (AI) or machine-learning (ML) classifier, configured to dynamically change the movement translation mode switching behavior of the device over time based on usage. Examples of suitable AI and/or ML techniques are described below with respect to FIG. 11.

Figure 6B:
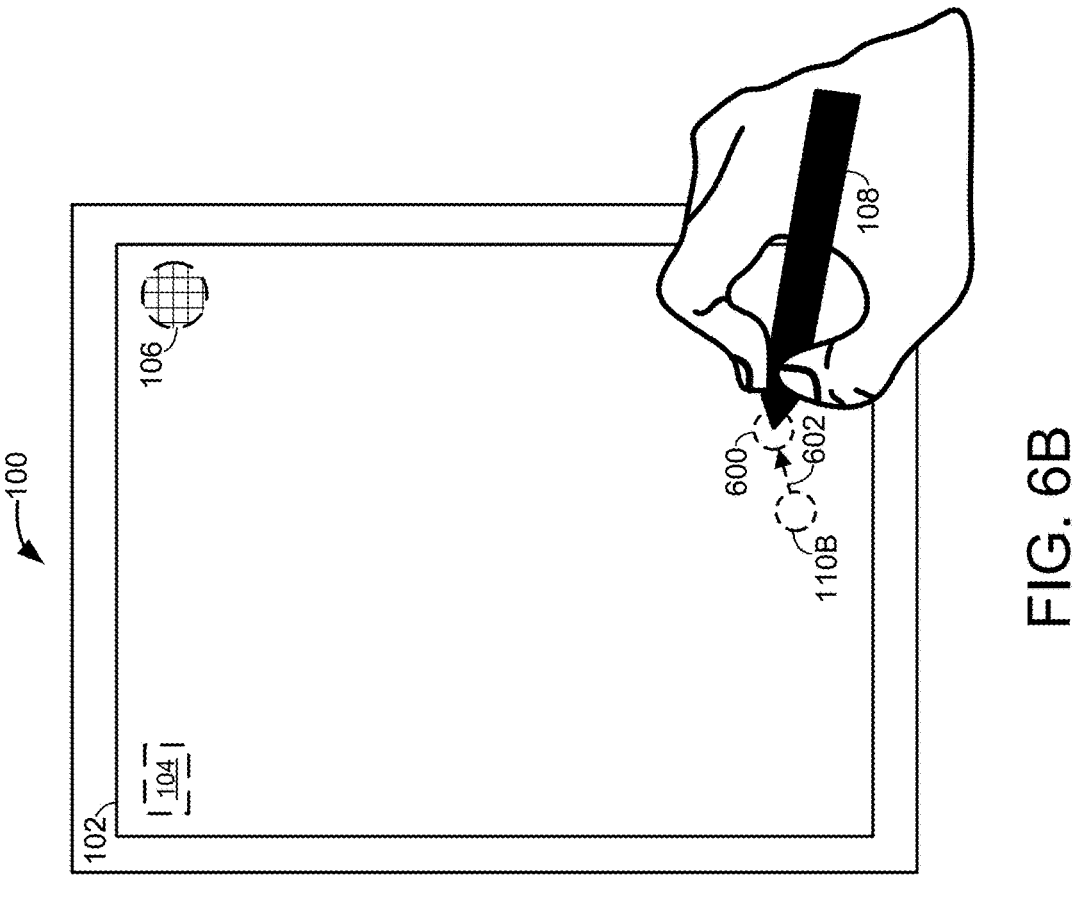
FIGS. 6A and 6B schematically illustrate movement of a stylus from a second surface position to a third surface position on a touch-sensitive display.
Figure 6A:
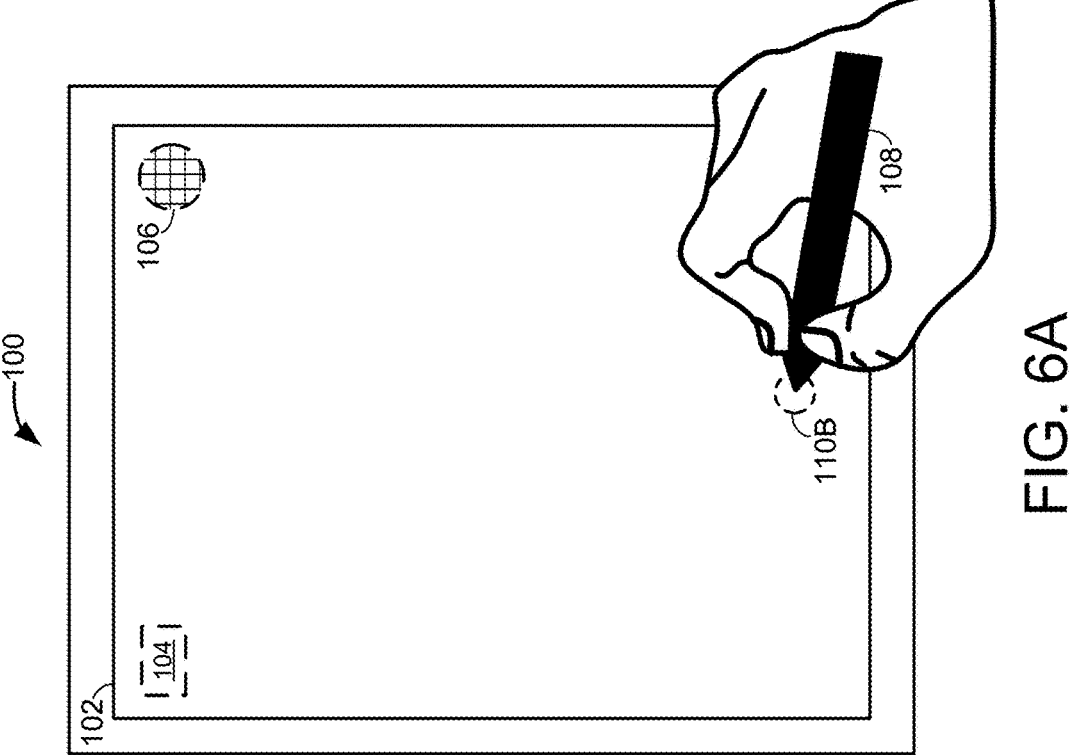

Regardless, returning to the example of FIG. 3, the touch-sensitive display device makes a determination to switch from the absolute movement translation to the relative movement translation based on one or more movement translation context parameters. At 308, method 300 includes detecting a second real-world movement of the stylus from the second surface position to a third surface position separated from the second surface position by a second real-world movement distance. This is schematically illustrated with respect to FIGS. 6A and 6B, which again show touch-sensitive display device 100. In FIG. 6A, the stylus 108 is still providing touch input at second surface position 110B. In FIG. 6B, the stylus has moved to a third surface position 600, separated from the second surface position by a second real-world movement distance 602.

Figure 7B:
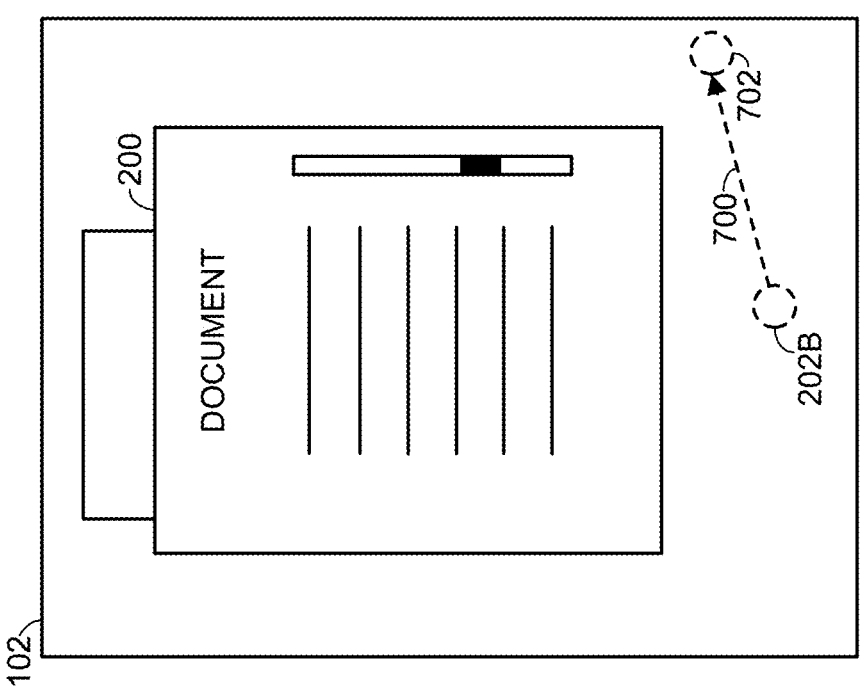
FIGS. 7A and 7B schematically illustrate movement of a stylus virtual input position using a relative movement translation.

Returning briefly to FIG. 3, at 310, method 300 includes translating the second real-world movement of the stylus into a corresponding second virtual movement from the second virtual input position to a third virtual input position using the relative movement translation, such that a second virtual movement distance between the second virtual input position and the third virtual input position is different from the second real-world movement distance. This is schematically illustrated with respect to FIGS. 7A and 7B. Specifically, FIG. 7A again shows touch-sensitive display 102 rendering graphical content 200, and shows the position of second virtual input position 202B, which is aligned with second surface position 110B. In FIG. 7B, the second real-world movement distance of the stylus has been translated into a second virtual movement distance 700, separating second virtual input position 202B from a third virtual input position 702.

In general, translating real-world movements of a stylus using a relative movement translation refers to moving the effective virtual input position of the stylus by a different amount from the actual real-world movement distance of the stylus. Typically, the direction of the movement is preserved, although in some cases the direction of the virtual movement may differ from the direction of the real-world movement. The nature of the difference between the real-world and virtual movements may depend on any suitable number of different factors. For example, using the relative movement translation may include using a function that outputs a virtual movement distance given one or more suitable inputs—e.g., a detected position of the stylus, a speed of the stylus movement, a direction of the movement, an acceleration of the stylus movement, and/or one or more of the movement translation context parameters discussed above. In some cases, the touch-sensitive display device may maintain multiple different functions that output different virtual movement distances given the same real-world stylus movement—e.g., based on a different weighting of one or more input factors.

Figure 7A:
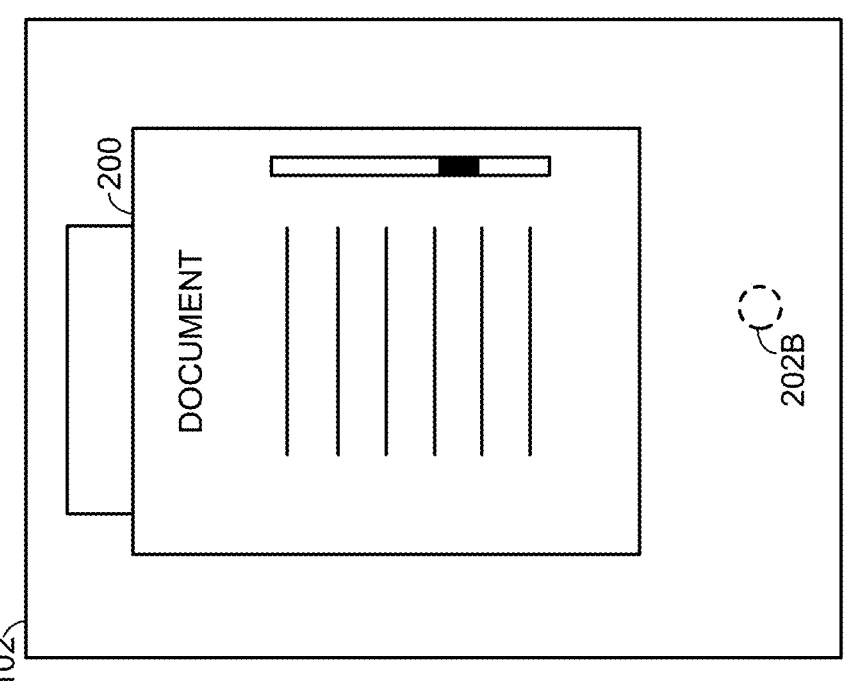

In the example of FIGS. 7A and 7B, the second real-world movement distance is less than the second virtual movement distance. Put another way, the real-world movement 602 of the stylus is translated into a virtual movement 700 that is relatively larger, meaning the effective input position of the stylus changed by a larger amount than the actual movement of the stylus relative to the display. As discussed above, this may be beneficial in some contexts—e.g., it may enable a user to manipulate areas of a graphical interface that are relatively distant, especially on relatively larger displays, while making relatively small real-world stylus movements. However, the difference between the real-world and virtual movement distances may vary depending on the implementation and on the specific context, as will be described in more detail below. Furthermore, in some cases, the real-world movement of the stylus may be translated into a virtual movement that is relatively smaller—e.g., allowing the user to manipulate an interface control more precisely by making relatively larger real-world stylus movements.

As discussed above, method 300 is described from the standpoint of switching from the absolute movement translation to the relative movement translation. In general, the touch-sensitive display device may switch between the absolute and relative movement translation modes at any suitable time and for any suitable reason. For instance, in an alternate scenario, a first real-world movement of a stylus may be translated into a first virtual movement distance using relative movement translation, due to presence of one or both of a first surface position and a second surface position in a virtual trackpad region. Based at least in part on one or more movement translation context parameters, the touch-sensitive display device may translate a second real-world movement of the stylus into a substantially equal second virtual movement distance using the absolute movement translation.

Accordingly, FIG. 8 illustrates another example method 800 for a touch-sensitive display device. As with method 300, method 800 may be implemented by any suitable computing system of one or more computing devices. A computing device that implements method 800 may have any suitable capabilities, hardware configuration, and form factor. As one example, method 800 may be implemented by touch-sensitive display device 100. In some cases, method 800 may be implemented by computing system 1100 described below with respect to FIG. 11.

At 802, method 800 includes, at a touch-sensitive display of a touch-sensitive display device, detecting a first real-world movement of a stylus from a first surface position to a second surface position separated from the first surface position by a first real-world movement distance. This may be done substantially as described above with respect to FIGS. 1A and 1B.

Continuing with method 800, at 804, the method includes, based at least in part on determining that one or both of the first and second surface positions fall within a virtual trackpad region of the touch-sensitive display, translating the first real-world movement of the stylus into a corresponding first virtual movement from a first virtual input position to a second virtual input position using a relative movement translation. As such, a first virtual movement distance between the first virtual input position and the second virtual input position is greater than the first real-world movement distance.

Figure 9B:
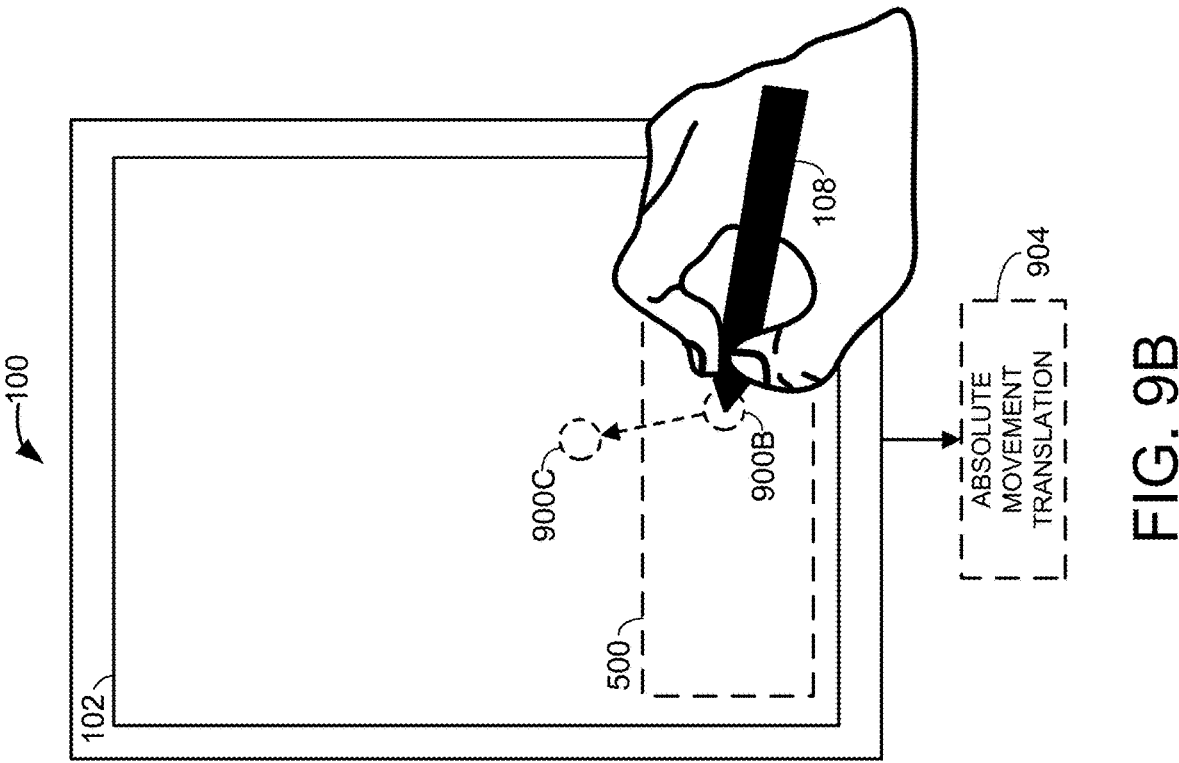
FIGS. 9A and 9B schematically illustrate switching from a relative movement translation to an absolute movement translation.
Figure 9A:
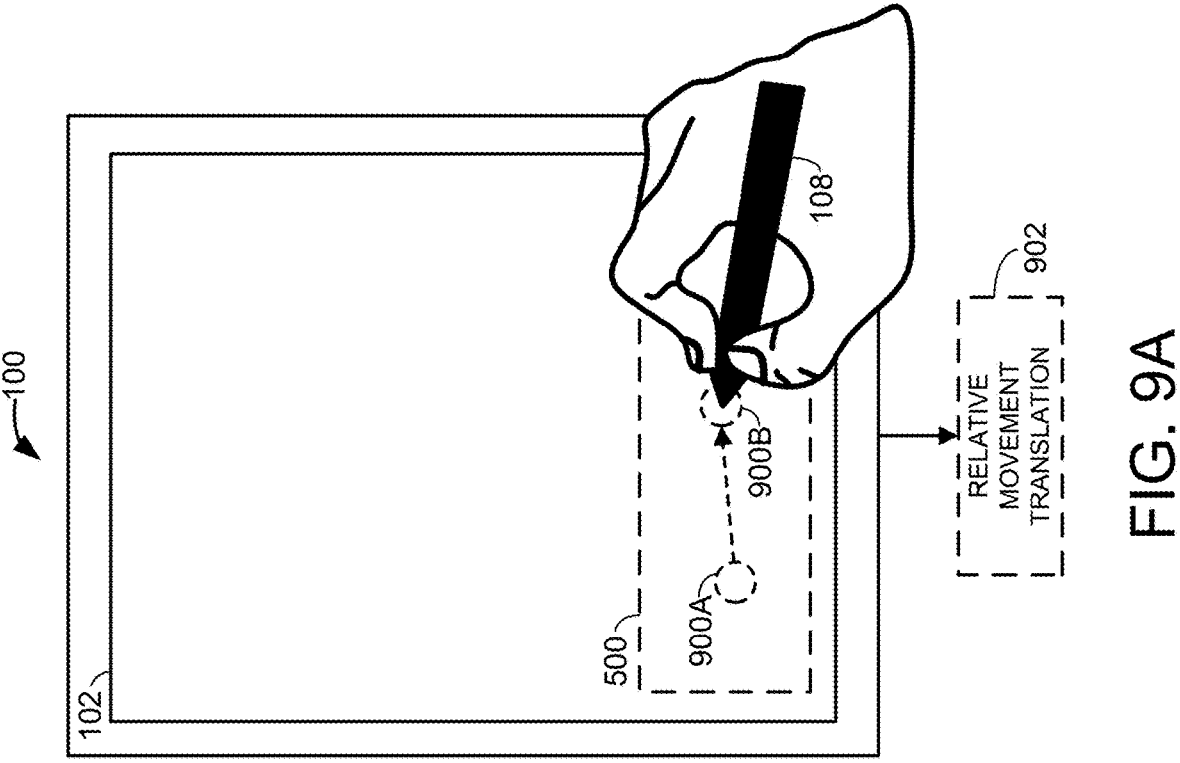

This scenario is schematically illustrated with respect to FIGS. 9A and 9B. Specifically, FIG. 9A again shows touch-sensitive display device 100 and display 102. In the illustrated example, stylus 108 has completed a real-world movement from a first surface position 900A to a second surface position 900B, each of which fall within virtual trackpad region 500. As such, the real-world movement of the stylus may be translated using a relative movement translation 902, substantially as described above with respect to FIGS. 6A-7B.

Returning briefly to FIG. 8, at 806, method 800 includes detecting a second real-world movement of the stylus from the second surface position to a third surface position separated from the second surface position by a second real-world movement distance. At 808, the method includes, based at least in part on the third surface position falling outside the virtual trackpad region, switching translation of stylus movements from the relative movement translation to an absolute movement translation. This scenario is schematically illustrated with respect to FIG. 9B, in which stylus 108 has moved from second surface position 900B to a third surface position 900C that falls outside of virtual trackpad region 900C. As such, the second real-world movement of the stylus may be translated using an absolute movement translation 904.

Thus, returning briefly to FIG. 8, at 810, method 800 includes translating the second real-world movement of the stylus into a corresponding second virtual movement from the second virtual input position to a third virtual input position using the absolute movement translation, such that a second virtual movement distance between the second virtual input position and the third virtual input position is substantially equal to the second real-world movement distance. Absolute movement translation may be performed substantially as described above with respect to FIGS. 1A-2B.

As discussed above, using a relative movement translation may include using a function to output a virtual movement distance for the stylus based on consideration of one or more input factors, such as stylus position, speed, acceleration, and/or one or more of the movement translation context parameters described above. Furthermore, in some cases, the touch-sensitive display device may maintain two or more different functions that weigh any or all of the above factors differently, and/or operate based on different input factors. Thus, switching to the relative movement translation may in some cases include selecting a particular translation function, and the touch-sensitive display device may switch between different relative functions while still operating in a relative translation mode.

As one example, the relative movement translation may use a first movement translation function when a tip of the stylus is contacting a surface of the touch-sensitive display, and a second movement translation when the tip of the stylus is spaced away from the surface of the touch-sensitive display. These different movement translation functions may vary in any suitable way. For instance, the first movement translation function may assign a greater weighting to a detected acceleration of the stylus—e.g., relatively more stylus acceleration causes a greater change in virtual input position, while the actual speed of the stylus has less of an effect. By contrast, the second movement translation function may assign a greater weighting to a detected speed of the stylus—e.g., relatively faster movements cause greater changes in virtual input position, with less regard to acceleration. This may be done because, when the stylus tip is contacting the display surface, the touch-sensitive display device may be capable of tracking stylus movement with relatively more certainty, thereby providing a technical benefit of reducing the burden of user input to the computing device by translating stylus movements more accurately depending on its position relative to the display surface.

In general, however, the touch-sensitive display device may maintain any suitable number of different relative translation functions. Each different function may use any suitable weighting of different input factors, and may be selected based on any suitable context.

Figure 10:
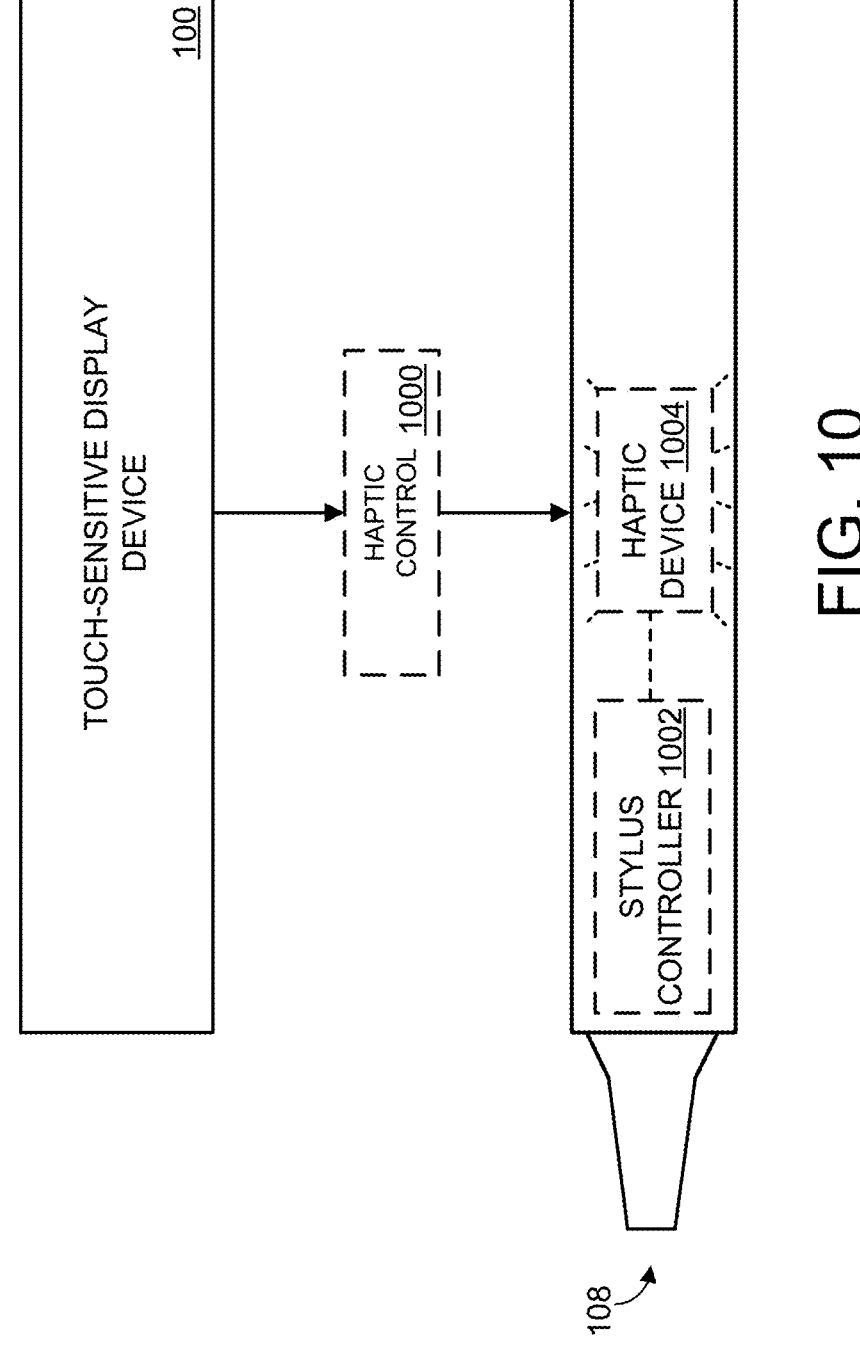
FIG. 10 schematically illustrates an example active stylus providing haptic feedback.

In some examples, the stylus (or other input object) used with the touch-sensitive display device may include a suitable on-board haptic feedback device, configured to vibrate and thereby provide haptic feedback to a human user. The haptic feedback of the stylus may be controlled by instructions transmitted by the touch-sensitive display device—e.g., via electrostatic communication or over a suitable RF communications channel. This is schematically illustrated with respect to FIG. 10, which shows a representation of touch-sensitive display device 100. The display device transmits haptic control instructions 1000 to stylus 108. The stylus includes a stylus controller 1002, which may be implemented via any suitable combination of computer logic componentry—e.g., as a logic machine as described below with respect to FIG. 11. The stylus controller receives the haptic control instructions from the touch-sensitive display device and controls a haptic feedback device 1004 to provide haptic feedback, as indicated by the dashed lines extending away from haptic feedback device 1004.

In some cases, the haptic feedback behavior of the stylus may vary depending on the current movement translation mode of the touch-sensitive display device. In other words, depending on the current context of the touch-sensitive display device (such as the current movement translation mode), the contents of haptic control instructions 1000 may vary. As one example, the touch-sensitive display device may control the stylus to provide different types of haptic responses when operating using relative movement translation, as opposed to when operating using absolute movement translation. Furthermore, within the relative movement translation mode, the haptic behavior of the stylus may vary based on the current context. In other words, while using the relative movement translation, the touch-sensitive display device may control the stylus to provide haptic feedback with haptic characteristics based at least in part on one or more haptic context parameters.

As one example, haptic feedback can be used to indicate when the virtual input position reaches areas of significance—e.g., a short pulse when the virtual input position reaches a display boundary or interactable interface element. This may be relatively more beneficial for relative movement translation than absolute movement translation, as during absolute movement translation it may be generally more apparent to the user when they have reached a display boundary or interactable interface element.

Furthermore, as indicated above, the haptic characteristics of the haptic feedback may vary based at least in part on one or more haptic context parameters. As one example, the one or more haptic context parameters may include a detected speed of movement of the stylus—e.g., an intensity and/or frequency of any haptic feedback may change depending on stylus movement speed. For example, as the stylus moves relatively faster, haptic feedback may be provided with relatively higher intensity. Alternatively, haptic intensity may be inversely proportional to stylus movement speed. For instance, at relatively low movement speeds, the touch-sensitive display device may use a high sensitivity haptic range, in which relatively more intense haptic feedback is provided in response to stylus movement. Increasing the stylus speed may cause the touch-sensitive display device to transition to a lower sensitivity haptic range, and any suitable number of different haptic ranges may be used—e.g., three different sensitivity ranges. This may provide a technical benefit of improving human-computer interaction by providing the user with feedback that varies depending on how the stylus's movement is being interpreted by the computing device.

As another example, the one or more haptic context parameters may include an indication of whether a tip of the stylus is contacting a surface of the touch-sensitive display. Contact between the stylus tip and display surface can in some cases have a deadening effect on any haptic feedback provided by the stylus. Thus, for example, haptic feedback may be provided with relatively more intensity when the stylus tip is contacting the display surface, as opposed to spaced away from the display surface.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 11:
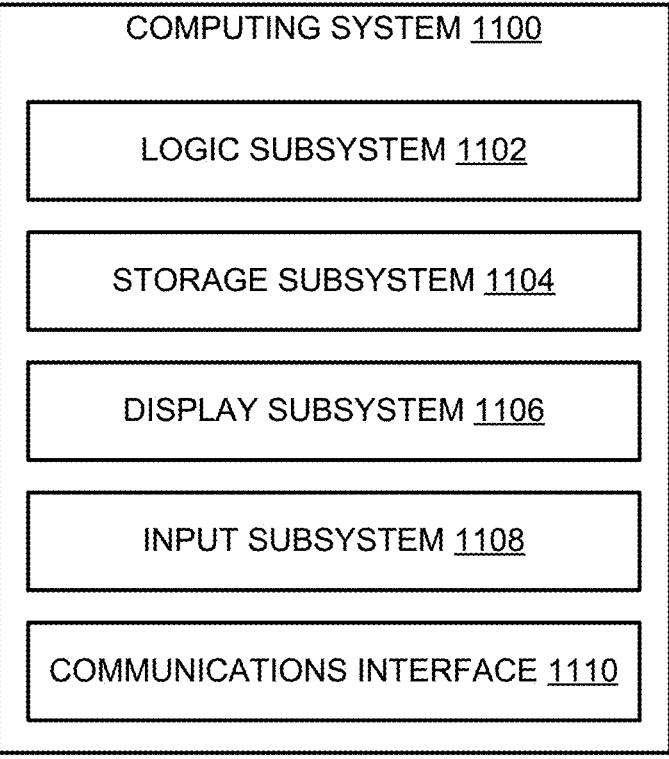
FIG. 11 schematically shows an example computing system.

FIG. 11 schematically shows a simplified representation of a computing system 1100 configured to provide any to all of the compute functionality described herein. Computing system 1100 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 1100 includes a logic subsystem 1102 and a storage subsystem 1104. Computing system 1100 may optionally include a display subsystem 1106, input subsystem 1108, communication subsystem 1110, and/or other subsystems not shown in FIG. 11.

Logic subsystem 1102 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 1104 includes one or more physical devices configured to temporarily and/or permanently hold computer information such as data and instructions executable by the logic subsystem. When the storage subsystem includes two or more devices, the devices may be collocated and/or remotely located. Storage subsystem 1104 may include volatile, nonvolatile, dynamic, static, read/write, read-only, random-access, sequential-access, location-addressable, file-addressable, and/or content-addressable devices. Storage subsystem 1104 may include removable and/or built-in devices. When the logic subsystem executes instructions, the state of storage subsystem 1104 may be transformed—e.g., to hold different data.

Aspects of logic subsystem 1102 and storage subsystem 1104 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or supersegmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 1106 may be used to present a visual representation of data held by storage subsystem 1104. This visual representation may take the form of a graphical user interface (GUI). Display subsystem 1106 may include one or more display devices utilizing virtually any type of technology. In some implementations, display subsystem may include one or more virtual-, augmented-, or mixed reality displays.

When included, input subsystem 1108 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1110 may be configured to communicatively couple computing system 1100 with one or more other computing devices. Communication subsystem 1110 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for a touch-sensitive display device comprises: at a touch-sensitive display of the touch-sensitive display device, detecting a first real-world movement of a stylus from a first surface position to a second surface position, the second surface position being separated from the first surface position by a first real-world movement distance; using an absolute movement translation to translate the first real-world movement of the stylus into a corresponding first virtual movement from a first virtual input position substantially aligned with the first surface position to a second virtual input position, such that the second virtual input position is substantially aligned with the second surface position, and a first virtual movement distance between the first virtual input position and the second virtual input position is substantially equal to the first real-world movement distance; based at least in part on one or more movement translation context parameters, switching translation of stylus movements from the absolute movement translation to a relative movement translation; detecting a second real-world movement of the stylus from the second surface position to a third surface position separated from the second surface position by a second real-world movement distance; and using the relative movement translation to translate the second real-world movement of the stylus into a corresponding second virtual movement from the second virtual input position to a third virtual input position, such that a second virtual movement distance between the second virtual input position and the third virtual input position is different from the second real-world movement distance. In this example or any other example, the second real-world movement distance is less than the second virtual movement distance. In this example or any other example, the relative movement translation uses a first movement translation function when a tip of the stylus is contacting a surface of the touch-sensitive display, and a second movement translation function when the tip of the stylus is spaced away from the surface of the touch-sensitive display. In this example or any other example, the first movement translation function assigns a greater weighting to a detected acceleration of the stylus as compared to the second movement translation function, while the second movement translation function assigns a greater weighting to a detected speed of the stylus as compared to the first movement translation function. In this example or any other example, the one or more movement translation context parameters include an indication of whether any of the first, second, and third surface positions fall within a virtual trackpad region defined relative to the touch-sensitive display. In this example or any other example, the virtual trackpad region has a smaller area than the touch-sensitive display. In this example or any other example, the one or more movement translation context parameters include an indication of whether a tip of the stylus is contacting a surface of the touch-sensitive display. In this example or any other example, the one or more movement translation context parameters include an indication of a status of a mode switching mechanism of the stylus. In this example or any other example, the one or more movement translation context parameters include an indication of one or more software applications being executed by the touch-sensitive display device. In this example or any other example, the one or more movement translation context parameters include an indication of a portion of a software application graphical interface targeted by any or all of the first, second, and third surface positions. In this example or any other example, the one or more movement translation context parameters include an indication that recent movements of the stylus relative to the touch-sensitive display are consistent with a predefined gesture. In this example or any other example, the method further comprises, while using the relative movement translation, controlling the stylus to provide haptic feedback with haptic characteristics based at least in part on one or more haptic context parameters. In this example or any other example, the one or more haptic context parameters include a detected speed of movement of the stylus. In this example or any other example, the one or more haptic context parameters include an indication of whether a tip of the stylus is contacting a surface of the touch-sensitive display.

In an example, a touch-sensitive display device comprises: a touch-sensitive display; a logic machine; and a storage machine holding instructions executable by the logic machine to: at the touch-sensitive display, detect a first real-world movement of a stylus from a first surface position to a second surface position, the second surface position being separated from the first surface position by a first real-world movement distance; using an absolute movement translation to translate the first real-world movement of the stylus into a corresponding first virtual movement from a first virtual input position substantially aligned with the first surface position to a second virtual input position, such that the second virtual input position is substantially aligned with the second surface position, and a first virtual movement distance between the first virtual input position and the second virtual input position is substantially equal to the first real-world movement distance; based at least in part on one or more movement translation context parameters, switch translation of stylus movements from the absolute movement translation to a relative movement translation; detect a second real-world movement of the stylus from the second surface position to a third surface position separated from the second surface position by a second real-world movement distance; and using the relative movement translation to translate the second real-world movement of the stylus into a corresponding second virtual movement from the second virtual input position to a third virtual input position, such that a second virtual movement distance between the second virtual input position and the third virtual input position is different from the second real-world movement distance. In this example or any other example, the second real-world movement distance is less than the second virtual movement distance. In this example or any other example, the relative movement translation uses a first movement translation function when a tip of the stylus is contacting a surface of the touch-sensitive display, and a second movement translation function when the tip of the stylus is spaced away from the surface of the touch-sensitive display. In this example or any other example, the first movement translation function assigns a greater weighting to a detected acceleration of the stylus as compared to the second movement translation function, while the second movement translation function assigns a greater weighting to a detected speed of the stylus as compared to the first movement translation function. In this example or any other example, the one or more movement translation context parameters include an indication of whether any of the first, second, and third surface positions fall within a virtual trackpad region defined relative to the touch-sensitive display.

In an example, a method for a touch-sensitive display device comprises: at a touch-sensitive display of the touch-sensitive display device, detecting a first real-world movement of a stylus from a first surface position to a second surface position, the second surface position being separated from the first surface position by a first real-world movement distance; based at least in part on determining that one or both of the first and second surface positions fall within a virtual trackpad region of the touch-sensitive display, using a relative movement translation to translate the first real-world movement of the stylus into a corresponding first virtual movement from a first virtual input position to a second virtual input position, such that a first virtual movement distance between the first virtual input position and the second virtual input position is greater than the first real-world movement distance; detecting a second real-world movement of the stylus from the second surface position to a third surface position separated from the second surface position by a second real-world movement distance; based at least in part on the third surface position falling outside the virtual trackpad region, switching translation of stylus movements from the relative movement translation to an absolute movement translation; and using the absolute movement translation, translating the second real-world movement of the stylus into a corresponding second virtual movement from the second virtual input position to a third virtual input position, such that a second virtual movement distance between the second virtual input position and the third virtual input position is substantially equal to the second real-world movement distance.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for a touch-sensitive display device, the method comprising:
at a touch-sensitive display of the touch-sensitive display device, detecting a first real-world movement of a stylus from a first surface position to a second surface position, the second surface position being separated from the first surface position by a first real-world movement distance;
using an absolute movement translation to translate the first real-world movement of the stylus into a corresponding first virtual movement from a first virtual input position substantially aligned with the first surface position to a second virtual input position, such that the second virtual input position is substantially aligned with the second surface position, and a first virtual movement distance between the first virtual input position and the second virtual input position is substantially equal to the first real-world movement distance;
based at least in part on one or more movement translation context parameters, switching translation of stylus movements from the absolute movement translation to a relative movement translation;
detecting a second real-world movement of the stylus from the second surface position to a third surface position separated from the second surface position by a second real-world movement distance; and
using the relative movement translation to translate the second real-world movement of the stylus into a corresponding second virtual movement from the second virtual input position to a third virtual input position, such that a second virtual movement distance between the second virtual input position and the third virtual input position is different from the second real-world movement distance;
wherein the relative movement translation uses a first movement translation function to translate the second real-world movement of the stylus into the corresponding second virtual movement when a tip of the stylus is contacting a surface of the touch-sensitive display, and a second movement translation function to translate the second real-world movement of the stylus into the corresponding second virtual movement when the tip of the stylus is spaced away from the surface of the touch-sensitive display; and
wherein the first movement translation function and the second movement translation function differ with respect to the second virtual movement distance for the second real-world movement of the stylus, and wherein the first movement translation function assigns a different weighting to a detected speed or a detected acceleration of the stylus as compared to the second movement translation function.

2. The method of claim 1, wherein the second real-world movement distance is less than the second virtual movement distance.

3. The method of claim 1, wherein the first movement translation function assigns a greater weighting to the detected acceleration of the stylus as compared to the second movement translation function, while the second movement translation function assigns a greater weighting to the detected speed of the stylus as compared to the first movement translation function.

4. The method of claim 1, wherein the one or more movement translation context parameters include an indication of whether any of the first or second surface positions fall within a virtual trackpad region defined relative to the touch-sensitive display.

5. The method of claim 4, wherein the virtual trackpad region has a smaller area than the touch-sensitive display.

6. The method of claim 1, wherein the one or more movement translation context parameters include an indication of whether the tip of the stylus is contacting the surface of the touch-sensitive display.

7. The method of claim 1, wherein the one or more movement translation context parameters include an indication of a status of a mode switching mechanism of the stylus.

8. The method of claim 1, wherein the one or more movement translation context parameters include an indication of one or more software applications being executed by the touch-sensitive display device.

9. The method of claim 1, wherein the one or more movement translation context parameters include an indication of a portion of a software application graphical interface targeted by either or both of the first and second surface positions.

10. The method of claim 1, wherein the one or more movement translation context parameters include an indication that recent movements of the stylus relative to the touch-sensitive display are consistent with a predefined gesture.

11. The method of claim 1, further comprising, while using the relative movement translation, controlling the stylus to provide haptic feedback with haptic characteristics based at least in part on one or more haptic context parameters.

12. The method of claim 11, wherein the one or more haptic context parameters include the speed of the stylus.

13. The method of claim 11, wherein the one or more haptic context parameters include an indication of whether the tip of the stylus is contacting the surface of the touch-sensitive display.

14. A touch-sensitive display device, comprising:
a touch-sensitive display;
a logic machine; and
a storage machine holding instructions executable by the logic machine to:
at the touch-sensitive display, detect a first real-world movement of a stylus from a first surface position to a second surface position, the second surface position being separated from the first surface position by a first real-world movement distance;
use an absolute movement translation to translate the first real-world movement of the stylus into a corresponding first virtual movement from a first virtual input position substantially aligned with the first surface position to a second virtual input position, such that the second virtual input position is substantially aligned with the second surface position, and a first virtual movement distance between the first virtual input position and the second virtual input position is substantially equal to the first real-world movement distance;
based at least in part on one or more movement translation context parameters, switch translation of stylus movements from the absolute movement translation to a relative movement translation;
detect a second real-world movement of the stylus from the second surface position to a third surface position separated from the second surface position by a second real-world movement distance; and use the relative movement translation to translate the second real-world movement of the stylus into a corresponding second virtual movement from the second virtual input position to a third virtual input position, such that a second virtual movement distance between the second virtual input position and the third virtual input position is different from the second real-world movement distance;

wherein the relative movement translation uses a first movement translation function to translate the second real-world movement of the stylus into the corresponding second virtual movement when a tip of the stylus is contacting a surface of the touch-sensitive display, and a second movement translation function to translate the second real-world movement of the stylus into the corresponding second virtual movement when the tip of the stylus is spaced away from the surface of the touch-sensitive display; and wherein the first movement translation function and the second movement translation function differ with respect to the second virtual movement distance for the second real-world movement of the stylus, and wherein the first movement translation function assigns a different weighting to a detected speed or a detected acceleration of the stylus as compared to the second movement translation function.

15. The touch-sensitive display device of claim 14, wherein the second real-world movement distance is less than the second virtual movement distance.

16. The touch-sensitive display device of claim 14, wherein the first movement translation function assigns a greater weighting to the detected acceleration of the stylus as compared to the second movement translation function, while the second movement translation function assigns a greater weighting to the detected speed of the stylus as compared to the first movement translation function.

17. The touch-sensitive display device of claim 14, wherein the one or more movement translation context parameters include an indication of whether any of the first or second surface positions fall within a virtual trackpad region defined relative to the touch-sensitive display.

18. A method for a touch-sensitive display device, the method comprising:
at a touch-sensitive display of the touch-sensitive display device, detecting a first real-world movement of a stylus from a first surface position to a second surface position, the second surface position being separated from the first surface position by a first real-world movement distance;
based at least in part on determining that one or both of the first and second surface positions fall within a virtual trackpad region of the touch-sensitive display, using a relative movement translation to translate the first real-world movement of the stylus into a corresponding first virtual movement from a first virtual input position to a second virtual input position, such that a first virtual movement distance between the first virtual input position and the second virtual input position is greater than the first real-world movement distance;
detecting a second real-world movement of the stylus from the second surface position to a third surface position separated from the second surface position by a second real-world movement distance;
based at least in part on the third surface position falling outside the virtual trackpad region, switching translation of stylus movements from the relative movement translation to an absolute movement translation; and using the absolute movement translation, translating the second real-world movement of the stylus into a corresponding second virtual movement from the second virtual input position to a third virtual input position, such that a second virtual movement distance between the second virtual input position and the third virtual input position is substantially equal to the second real-world movement distance;

wherein the relative movement translation uses a first movement translation function to translate the first real-world movement of the stylus into the corresponding first virtual movement when a tip of the stylus is contacting a surface of the touch-sensitive display, and a second movement translation function to translate the first real-world movement of the stylus into the corresponding first virtual movement when the tip of the stylus is spaced away from the surface of the touch-sensitive display; and wherein the first movement translation function and the second movement translation function differ with respect to the first virtual movement distance for the first real-world movement of the stylus, and wherein the first movement translation function assigns a different weighting to a detected speed or a detected acceleration of the stylus as compared to the second movement translation function.

19. The method of claim 18, wherein the first movement translation function assigns a greater weighting to the detected acceleration of the stylus as compared to the second movement translation function, while the second movement translation function assigns a greater weighting to the detected speed of the stylus as compared to the first movement translation function.

20. The method of claim 18, further comprising, while using the relative movement translation, controlling the stylus to provide haptic feedback with haptic characteristics based at least in part on one or more haptic context parameters.

\* \* \* \* \*